United States Patent [19]

Taylor et al.

[11] Patent Number: 5,407,585
[45] Date of Patent: Apr. 18, 1995

[54] METHOD OF DEMULSIFYING WATER-IN-OIL EMULSIONS

[75] Inventors: Grahame N. Taylor, Houston, Tex.; Richard Mgla, Calgary, Canada

[73] Assignee: Exxon Chemical Patents Inc., Linden, N.J.

[21] Appl. No.: 107,288

[22] Filed: Aug. 16, 1993

[51] Int. Cl.⁶ ............................................. B01D 17/05
[52] U.S. Cl. .................................... 210/708; 208/188; 210/728; 210/732; 252/331; 252/358
[58] Field of Search ................ 208/188; 210/708, 725, 210/727, 728, 729, 732, 749; 252/331, 358

[56] References Cited

U.S. PATENT DOCUMENTS

| | | | |
|---|---|---|---|
| 3,383,325 | 5/1968 | Seale et al. | 252/331 |
| 4,117,031 | 9/1978 | Macenka et al. | 252/331 |
| 4,321,147 | 3/1982 | McCoy et al. | 210/708 |
| 4,420,413 | 12/1983 | Diery et al. | 252/331 |
| 4,465,817 | 8/1984 | Billenstein et al. | 252/331 |
| 5,039,450 | 8/1991 | Kupfer et al. | 210/708 |

Primary Examiner—Peter A. Hruskoci
Attorney, Agent, or Firm—R. L. Graham

[57] ABSTRACT

Water-in-oil emulsions are broken by the use of adducts prepared by reacting high molecular weight polyalkylene glycol with ethylene oxide, or diglycidyl ether, or both ethylene oxide and diglycidyl ether. The adduct demulsifiers may be used alone or as a blend with other demulsifiers.

18 Claims, No Drawings

METHOD OF DEMULSIFYING WATER-IN-OIL EMULSIONS

BACKGROUND OF THE INVENTION

This invention relates generally to a method of demulsifying water-in-oil emulsions using polyalkylene glycol derivatives. In one aspect, the method relates to the demulsification of crude oil in water emulsion.

In the production of oil from oil wells, the produced fluids frequently include water in the form of free water or emulsion. In order for the oil to be of pipeline quality, it is necessary to reduce the water content to below a specified amount (e.g. below 1.0%).

A variety of mechanical, electrical, and chemical methods are used in the dehydration of produced fluids. The present invention relates specifically to the chemical treatment using chemicals referred to as demulsifiers. A demulsifier is defined as a single or a blend of surfactant compounds in a suitable solvent system which is formulated to treat a particular emulsion on an optimum cost/performance basis. The method of the present invention employs demulsifiers for treating water-in-oil emulsions, the most common type of emulsions encountered in oil field production. It specifically excludes the treatment of oil-in-water type emulsions (i.e. reverse emulsions).

A variety of demulsifiers are known in the art, including those derived from alcohols, fatty acids, fatty amines, glycols, and alkylphenol formaldehyde condensation product.

As noted above, the method of the present invention involves the use of certain polyalkylene glycol derivatives, specif-ically adducts of a high molecular weight polyalkylene glycol and ethylene oxide and/or a diglycidyl ether.

As illustrated by the following references, polyalkylene glycol and its derivatives have been long used in the demulsification of oils.

(a) U.S. Pat. No. 4,374,734 discloses the use of polyoxypropylene polyol (mw of 2,000 to 4,500) for the breaking of water-in-oil emulsions wherein the emulsion is produced by surfactant flooding.

(b) U.S. Pat. No. 3,835,060 teaches that conventional demulsifiers include polyoxyalkylene glycol and block polymers of polyoxyethylene-polyoxypropylene.

(c) U.S. Pat. No. 2,754,271 discloses treating agents comprising an addition product of an alkylene oxide with an aliphatic dihydric alcohol and further describes the dihydric alcohol (polyoxypropylene diols) are known to have molecular weights as high as about 3,000.

(d) U.S. Pat. No. 3,557,017 discloses water-in-oil demulsifiers comprising ultra high molecular weight (of molecular weight at least 100,000) polymers. The polymers are selected from a group that includes polyoxyalkylene polymers and copolymers of monomeric alkylene oxides having a single vicinal epoxy group. Other references which disclose low molecular weight polyalkylene polyhydric reacted with other compounds include U.S. Pat. No. 3,383,326, U.S. Pat. No. 3,511,882, and U.S. Pat. No. 3,676,501. Other references which disclose polyhidric alcohols but not glycols include U.S. Pat. No. 2,996,551, U.S. Pat. No. 3,078,271, and U.S. Pat. No. 4,305,835.

SUMMARY OF THE INVENTION

The method of the present invention involves treating water-in-oil emulsions of petroleum operations with a demulsifier to break the emulsion and separate the oil and water. The demulsifier is a derivative or adduct of a high molecular weight polyalkylene glycol (PAG) and ethylene oxide (EO) and/or a diglycidyl ether (DGE). The PAG is a diol and is either a polypropylene glycol or a polybutylene glycol and has a molecular weight of greater than 6,000 and up to 26,000, preferably between 7,000 and 20,000.

The preferred demulsifier useable in the present invention is an adduct of PAG and a DGE having the following formula:

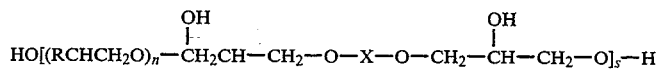

where
n is an integer ranging from 120 to 350, preferably 135 to 260, most preferably 150 to 200;
s is an integer ranging from 1 to 100, preferably from 2 to 50, most preferably from 5 to 40.
R is $CH_3$ or $C_2H_5$, preferably $CH_3$;
X is selected from the group consisting of bis-Phenol A, $(CH_2)_p$, and

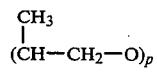

where p is an integer ranging from 1 to 10, preferably from 2 to 8.

Another preferred demulsifier is a PAG/DGE/EO adduct prepared by reacting PAG with DGE followed by the further reaction with EO.

A novel feature of the present invention is the high molecular weight of the precursor polyalkylene glycol [polypropylene glycol (PPG) or polybutylene glycol (PBG)]. PPG diols and PBG diols of MW greater than 4,000 to 5,000 have not been used in the synthesis of water-in-oil demulsifiers. The high molecular weight of the PAG derivative demulsifier offers the advantage of superior oil dehydration when used alone and superior initial water drop and oil dehydration when acting synergistically with other conventional demulsifiers.

In addition, the present invention involves the use of the adducts described above in combination with other demulsifiers, particularly oxyalkylated phenol formaldehyde resin, polyalkylene glycols and esters.

DESCRIPTION OF THE PREFERRED EMBODIMENTS

As indicated above, the polyalkylene glycol derivative contemplated for use in the method of the present invention is an adduct of a high MW PAG and EO and/or DGE.

The precursor PAG in a preferred embodiment of the present has the following formula (I):

where
R is $CH_3$ or $C_2H_5$; and n ranges from 120 to 350, preferably 135 to 260, and most preferably 150 to 200; and the compound has a molecular weight greater than 6,000 and up to 26,000. Preferably R is CH3 and the molecular (b) Adducts of Polyalkylene Glycol and Diglycidyl Ether:

The addition reaction of PAG of Formula I with certain DGE's extends the molecular chain1

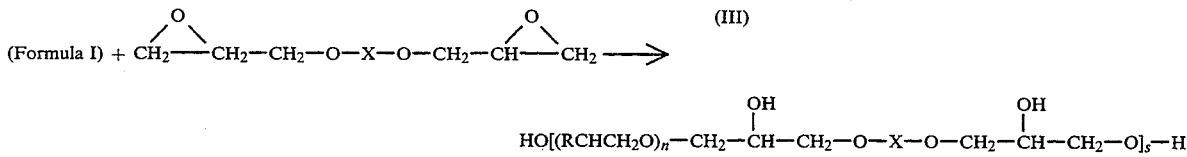

weight of the polyalkylene glycol is between 7,000 and 20,000 and most preferably between 8,000 and 18,000. Molecular weight refers to that calculated from hydroxyl number measurement.

The precursor PAG having the proper molecular weight for use in the method of the present invention may be prepared using a catalyst selected from the group consisting of barium, strontium and their oxides, hydroxides, hydrated hydroxides or monohydroxide salts, or mixtures thereof or a double metal cyanide complex compound wherein one of the metals of said complex compound is selected from the group consisting of Zn(II), Fe(II), Fe(III), Co(II), Ni(II), Mo(IV), Mo(VI), Al(III), V(IV), V(V), Sr(II), W(IV), W(VI), Mn(II), and Cr(III) and mixtures thereof, and wherein the other metal of said complex compound is a metal selected from the group consisting of Fe(II), Fe(III), Co(II), Co(III), Cr(II), Cr(III), Mn(II), Mn(III), V(IV), and V(V) and mixtures thereof. These methods are where R, X, and n are as defined above; and
s is an integer ranging from 1 to 100, preferably 2 to 50, most preferably 5 to 40.

The preferred DGE is diglycidyl ether of bis-Phenol A, ($X=-C_6H_5-C(CH_3)_2-C_6H_5-$). Note that X is the link or bridge between the glycidyl ether groups. The preferred bridge is bis Phenol A.

The adducts PAG and DGE may be prepared as follows: The polyalkylene glycol is dissolved in a hydrocarbon and catalyzed using an alkali or alkaline earth metal hydroxide. The partial alkoxide of the polyalkylene glycol reacted at 150° C. with the appropriate diglycidyl ether for 12 hours.

(c) Adducts of PAG, EO, and DGE:

Formula II PAG/EO adducts may be further reacted with a DGE described above with reference to the Formula III adduct. This addition reaction yields the following adduct (Formula IV):

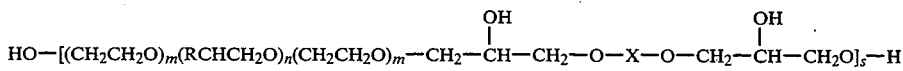

described in detail in U.S. Pat. Nos. 5,010,187 and 3,278,457, the disclosures of which are incorporated herein by reference.

The several adducts of PAG and EO and/or DGE are described below:

(a) Adducts of Polyalkylene Glycol and Ethylene Oxide:

The addition reaction of the PAG of Formula I with ethylene oxide forms a product having the following formula (Formula II):

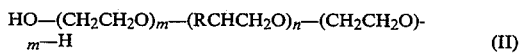

where R and n are as defined above, and m ranges from 1 to 100, preferably from 3 to 60, most preferably 5 to 50.

This reaction may be carried out under the following conditions: The polyalkylene glycol is dissolved in a hydrocarbon solvent and catalyzed with an alkaline or alkaline earth metal hydroxide. The partial alkoxide of the polyalkylene glycol is reacted at 150° C. at 50 psi with ethylene oxide for approximately 2 hours.

where

R, m, n, and X are as defined above; and
s is an integer ranging from 1 to 100, preferably from 2 to 50, most preferably 5 to 40.

The preferred PAG/EO/DGE adduct is the addition reaction product of polypropylene glycol, (having a molecular weight of greater than 6,000 and up to 26,000, with ethylene oxide, which in turn is reacted with DGE (preferably DGE of bis-Phenol-A). The reactions may be carried out in the manner described for Formula III.

The molecular chain of Formula IV adduct may be further extended by the addition reaction of EO with Formula IV product, yielding Formula V adduct:

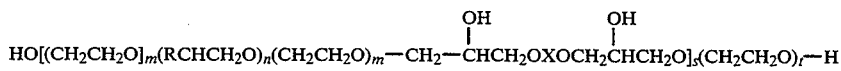

where R, m, n, X, and s are described above and t/s ranges from 1 to 100, preferably 3 to 70, and most preferably 5 to 60.

(d) Adducts of PAG, DGE and EO:

The addition reaction of Formula III adduct with EO yields an adduct of the following formula (VI):

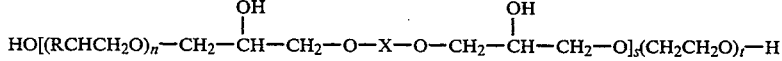

where R, n, X, s and t are as defined above.

The mole ratios of the addition reactants may range widely (i.e. 5:1 to 1:100). The addition reactions to produce the adducts of the present invention may preferably be as follows:

| Adducts | Mole Ratio | Formula |
| --- | --- | --- |
| PAG/EO | 1:5 to 1:50 | II |
| PAG/DGE | 4:1 to 1:4 | III |
| Formula II Adduct/DGE | 4:1 to 1:4 | IV |
| Formula IV Adduct/EO | 1:5 to 1:50 | V |
| Formula III Adduct/EO | 1:5 to 1:50 | VI |

In tailoring the demulsifier formulation for a particular treatment, it may be preferred in many such treatments to combine the demulsifier described above with other demulsifiers. The commercially available demulsifier which can be used in a blend with the adducts described above include the following:

(a) polyfunctional polyalkylene glycols
Example formula:

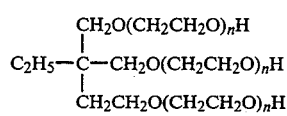

where n ranges from 1 to 200.

(b) oxyalkylated phenol formaldehyde resins having a molecular weight between 1,000 to 20,000.

(c) derivatives of the above.

These commercially available demulsifiers are oxyalkylation products of ethylene or propylene oxide with fatty acids, fatty amines, glycols, or phenol-formaldehyde condensation compounds.

The preferred demulsifiers useable with the adducts described herein are the oxyalkylated glycol esters and/or the oxyalkylated phenol formaldehyde resins.

When blends are used, the adducts described herein should constitute from 5 to 95 vol. % of the blend in a solvent.

Operation:

In utilizing the demulsifier (i.e. adducts of PAG as described above) in the method of the present invention a formulation comprising the PAG adducts dissolved in a suitable solvent is prepared. The formulation may include other additives which provide additional function or enhancement to the effectiveness of the demulsifier. Solvents include aromatic hydrocarbon solvents such as xylene, etc. Additional additives include commercial demulsifiers described above, polyalkylene glycol esters and oxyalkylated phenol formaldehyde resins.

The % of active adduct in the formulation may range within wide limits, but 5 to 90 wt % is preferred, most preferably 25 to 75 wt %.

The composition and concentration of the actives in the formulation will be tailored for a specific treatment in the same manner conventional demulsifiers are applied. This "fine tuning" of the formulation is frequently based on bottle tests. For crude oil treatment, the water-in-crude oil emulsion may range from 1 to 99 vol % water. Treatment concentrations of the adduct demulsifier (actives) described herein may range from 10 to 1,000 ppm, preferably 150 to 500 ppm actives in the emulsion, and may be injected into the system by conventional procedure and equipment: downhole injection, wellhead injection, or batch treatment.

In treating refined petroleum products, (e.g. lube oil, gasoline, fuel oil, kerosene, etc.), the suspended water, of course, is much lower, generally less than 1%.

Although the formulation for these treatments will likely be different than crude oil treatments, the adducts will be an essential component.

EXPERIMENTS

Bottle Tests:

Bottle tests were conducted by placing a water-in-oil emulsion sample (100 ml) in a graduated prescription bottle and adding a measured amount of a demulsifier chemical. Each bottle was capped and then shaken for a specified time (typically 5 minutes) in order to mix the contents. The bottles were set aside in a hot water bath and the waterdrop was observed. This is the time for separation of the water phase of the emulsion from the oil phase.

Following the waterdrop tests, each emulsion sample (free of freewater) was subjected to a centrifuging (grindout) by the following procedure:

(a) API centrifuge tubes were filled with 50% xylene and 50% of the emulsion (no free water).

(b) The samples were placed in a hot water bath for a recorded period of time.

(c) The samples were then centrifuged at 1800 rpm for 3 minutes.

(d) The amount of water in each tube was recorded and the % of water retained in the oil determined.

The demulsifiers tested were as follows (all adduct samples were prepared with PPG having an MW of between 8,000 and 18,000), the DGE's were diglycidyl ether of bis-Phenol A.

Formula III: An adduct of PPG and a DGE reacted in a mole ratio of 1:1.

Formula VI: The Formula III adduct was reacted with EO wherein t/s was 16 for VIa, 36 for VIb, and 60 for VIc.

TABLE I

| Formula | PPM | Temp. °C. | Water % | Drop Time | Grindout % Water % |
| --- | --- | --- | --- | --- | --- |
| III | 40 | 65° C. | 7 | 5 min. | 0.4 |
| VIa | 40 | 65° C. | 20 | 5 min. | 0.4 |
| VIb | 40 | 65° C. | 22 | 5 min. | 0.6 |
| VIc | 40 | 65° C. | 22 | 5 min. | 0.4 |
| VII Conventional | 40 | 65° C. | 0 | | |

Additional water drop tests were carried out to compare the effects of adducts prepared from high molecular weight PAG (MW between 8,000–18,000) with adducts prepared from low molecular weight PAG's (MW of 4,000).

A Formula III adduct was prepared from PAG wherein the R was $CH_3$ and n was 190. An identical comparative adduct (Formula III(c)) was prepared except n was 70.

Formula III adduct and III(c) adduct were each used in a blend that included 80 vol % of a conventional polyfunctional polyalkylene glycol emulsion breaker.

These data are presented in Table II as Test Nos. 1 and 1C. Similar tests were carried out except the Formula III and IIIC adducts were each used with two conventional emulsion breakers (30 vol % of a polyalkylene glycol ester and 50 vol % of an oxyalkylated phenol formaldehyde resin). These results are presented in Table II as Test Nos. 2 and 2C.

A Formula VI adduct was prepared wherein R and n were CH3 and 190, respectively, and a Formula VIc adduct was prepared identical to Formula VI except n was 70. The bottle test results are presented in Table II as Test Nos. 3 and 3C.

TABLE II

| Test No. | Formula | Concentration PPM | Temp. (°C.) | Water Drop % | Time (Hrs | Water in Oil | Time (Hrs.) |
|---|---|---|---|---|---|---|---|
| 1 | III | 250 | 85 | 54 | 24 | 0.4 | 24 |
| 1C | IIIc | 250 | 85 | 49 | 24 | 0.8 | 24 |
| 2 | III | 200 | — | 25 | 12 | 2 | 12 |
| 2C | IIIc | 200 | — | 15 | 12 | 4 | 12 |
| 3 | VI | 100 | 30 | 56 | 6 | 0.2 | 6 |
| 3C | VIc | 100 | 30 | 58 | 6 | 0.6 | 6 |

The Table I data demonstrate the effectiveness of the adducts shown reducing the water retained in the oil to levels of 0 1 to 0 5%.

The Table II data demonstrate that the adducts tested were far more effective in reducing the water retained in the oil. With-Formula III demulsifier, the oil retained one-half as much water vis-a-vis the Formula IIIC demulsifier. Since the other demulsifiers used in the blends were identical, the improved results were attributed solely to the effects of the Formula III adducts. The Formula VI demulsifier also resulted in improved results in terms of water retained in the oil (0.2% vs. 0.6%) achieved with the Formula IIIC demulsifier.

What is claimed is:

1. A method of demulsifying water-in-oil emulsions wherein an effective amount of a demulsifying agent is introduced into the emulsion to separate the emulsion into a water phase and an oil phase, said agent being an adduct of
    (a) a polyalkylene glycol having a molecular weight of greater than 6,000 and up to 26,000 and wherein the alkylene group comprises from 3 to 4 carbon atoms, and
    (b) a compound or compounds selected from the group consisting of
        (i) ethylene oxide, and
        (ii) diglycidyl ether
    wherein the adduct is prepared by reacting (a) and (b) at a mole ratio ranging from 5:1 to 1:100.

2. The method of claim 1 wherein the polyalkylene glycol has a molecular weight of 8,000 to 18,000.

3. The method of claim 1 wherein (b) is ethylene oxide and the adduct has the following formula:

HO—(CH2CH2O)$_m$(RCHCH2O)$_n$(CH2CH$^2$O)$_m$—H where
n ranges from 120 to 350,
m ranges from 1 to 100, and
R is CH3— or C2H5—.

4. The method of claim 3 wherein n ranges from 150 to 200.

5. The method of claim 4 where m ranges from 5 to 50.

6. The method of claim 3 wherein R is CH3.

7. The method of claim 1 wherein the demulsifying agent is introduced into the emulsion to provide the emulsion with from 10 to 1,000 ppm of the demulsifying agent.

8. The method of claim 1 wherein the adduct is the addition reaction product of the polyalkylene glycol and the diglycidyl ether, said reaction product having the following formula:

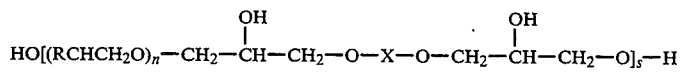

where
R is CH3 or C2H5,
n is an integer ranging from 120 to 350,
X is selected from the group consisting of bis-phenol A; (CH2)$_p$; and CH3 (CH—CH2—O)$_p$;
where
p is an integer ranging from 1 to 10;
s is an integer ranging from 1 to 100.

9. The method of claim 8 wherein the diglycidyl ether is diglycidyl ether of bis-Phenol A.

10. The method of claim 1 wherein the adduct is the reaction product of the polyalkylene glycol and ethylene oxide and which is further reacted coil diglycidyl ether and has the following formula:

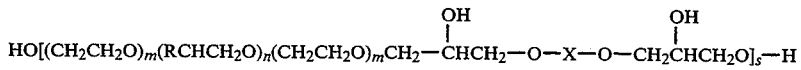

where
m is an integer ranging from 1 to 100;
n is an integer ranging from 120 to 350;
R is CH3 or C2H5;
s is an integer ranging from 1 to 100; and
X is selected from the group consisting of bis-phenol A; (CH2)$_p$; and

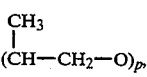

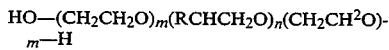

where p is an integer ranging from 1 to 10.

11. The method of claim 1 wherein the adduct is the addition reaction product of the polyalkylene glycol and the diglycidyl ether which is further reacted with ethylene oxide having the following formula:

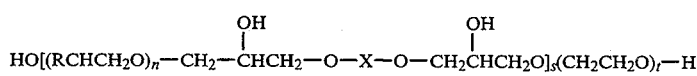

where
- R is CH$_3$ or C$_2$H$_5$;
- n is an integer ranging from 120 to 350;
- s is an integer ranging from 1 to 100;
- t/s is an integer ranging from 1 to 100; and
- X is selected from the group consisting of bis-phenol A; (CH$_2$)$_p$; and

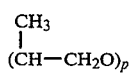

where p is an integer ranging from 1 to 10.

12. The method of claim 1 wherein the adduct is the reaction product of the polyalkylene glycol and ethylene oxide and diglycidyl ether and has the following formula:

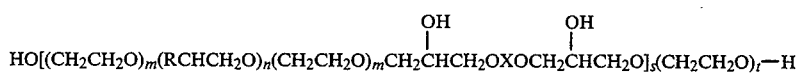

where
- m is an integer ranging from 1 to 100;
- n is an integer ranging from 120 to 350;
- R is CH$_3$ or C$_2$H$_5$;
- s is an integer ranging from 1 to 100;
- t/s is an integer ranging from 1 to 100; and
- X is selected from the group consisting of bis-phenol A, (CH$_2$)$_p$, and

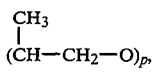

where p is an integer ranging from 1 to 10.

13. A method of demulsifying water-in-oil emulsion wherein a demulsifying amount of a demulsifying agent is introduced into the emulsion at a concentration ranging from 10 to 1,000 ppm to separate the emulsion into a water phase and an oil phase, the improvement wherein the demulsifying agent is the addition reaction product of:
(a) a polyalkylene glycol having a molecular weight of greater than 6,000 and not greater than 26,000, wherein the alkylene group comprises from 3 to 4 carbon atoms;
(b) ethylene oxide wherein the mole ratio of (a):(b) ranges from 1:1 to 1:100.

14. The method of claim 13 wherein the emulsifying agent is the adduct of (a) and (b), further reacted with a diglycidyl ether wherein the glycidyl groups are bonded by a bridge selected from the group consisting of bis-phenol A, (CH$_2$)$_p$, and

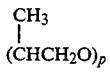

where p is an integer ranging from 1 to 10; the mole ratio of the (a)/(b) adduct and the diglycidyl ether ranging from 4:1 to 1:4.

15. The method of claim 13 wherein the demulsifying agent is the adduct of (a) and (b) reacted with the diglycidyl ether and further reacted with ethylene oxide, the mole ratio of the adduct of (a), (b), and diglycidyl ether and the ethylene oxide, ranges from 4:1 to 1:4.

16. A method of demulsifying water-in-oil emulsion wherein a demulsifying amount of a demulsifying agent is introduced into the emulsion at a concentration ranging from 10 to 1,000 ppm to separate the emulsion into a water phase and an oil phase, the improvement wherein the demulsifying agent is the addition reaction product of:
(a) a polyalkylene glycol having a molecular weight of from greater than 6,000 and not greater than 26,000, wherein the alkylene group comprises from 3 to 4 carbon atoms; and
(b) diglycidyl ether wherein the glycidyl groups are bonded by a bridge selected from this group consisting of bis-phenol A, (CH$_2$)$_p$, and

where p ranges from 1 to 10, the mole ratio of (a):(b) ranges from 4:1 to 1:4.

17. The method of claim 16 wherein the demulsifying agent is the adduct of (a) and (b) and is further reacted with ethylene oxide, the molar ratio of the adduct and ethylene oxide ranging from 1:5 to 1:50.

18. A method of demulsifying water-in-oil emulsions wherein an effective amount of a demulsifying agent is introduced into the emulsion to separate the emulsion into a water phase and an oil phase, said agent comprising a blend of:
(a) an adduct of
(i) a polyalkylene glycol having a molecular weight of greater than 6,000 and up to 26,000, and wherein the alkylene group comprises from 3 to 4 carbon atoms, and
(ii) a compound or compounds selected from the group consisting of ethylene oxide and diglycidyl ether, and
(b) a demulsifier selected from the group consisting of oxyalkylated alcohols, fatty acids, fatty amines, glycols, and alkyl phenol-formaldehyde condensation compounds, wherein the adduct comprises at least 5 vol % of the blend.

* * * * *